(12) United States Patent
Melikechi (10) Patent No.: US 10,267,374 B2
(45) Date of Patent: Apr. 23, 2019

(54) IMPACT ATTENUATION DEVICE

(71) Applicant: COCKERILL MAINTENANCE & INGENIERIE S.A., Seraing (BE)

(72) Inventor: Abdenour Melikechi, Jodoigne (BE)

(73) Assignee: CMI DEFENCE S.A., Loncin (BE)

( * ) Notice: Subject to any disclaimer, the term of this patent is extended or adjusted under 35 U.S.C. 154(b) by 0 days.

(21) Appl. No.: 15/111,499

(22) PCT Filed: Jan. 20, 2015

(86) PCT No.: PCT/EP2015/051008
§ 371 (c)(1),
(2) Date: Jul. 14, 2016

(87) PCT Pub. No.: WO2015/113867
PCT Pub. Date: Aug. 6, 2015

(65) Prior Publication Data
US 2016/0333958 A1 Nov. 17, 2016

(30) Foreign Application Priority Data

Jan. 29, 2014 (BE) .................................. 2014/0046

(51) Int. Cl.
| F16F 7/12 | (2006.01) |
| B61G 11/16 | (2006.01) |
| B60N 2/24 | (2006.01) |
| B60N 2/42 | (2006.01) |
| B64D 1/14 | (2006.01) |

(52) U.S. Cl.
CPC ................ F16F 7/126 (2013.01); B60N 2/24 (2013.01); B60N 2/4242 (2013.01); B61G 11/16 (2013.01); B64D 1/14 (2013.01)

(58) Field of Classification Search
CPC .................................. F16F 7/125; F16F 7/126
USPC .......................................................... 188/374
See application file for complete search history.

(56) References Cited

U.S. PATENT DOCUMENTS

| 3,392,599 A | * | 7/1968 | White | B62D 1/192 |
| | | | | 180/78 |
| 3,446,469 A | | 5/1969 | Whitten | |
| 3,604,285 A | * | 9/1971 | Olsson | B62D 1/192 |
| | | | | 188/371 |
| 3,696,891 A | * | 10/1972 | Poe | F16F 7/00 |
| | | | | 188/129 |

(Continued)

FOREIGN PATENT DOCUMENTS

| EP | 1155940 A2 | 11/2001 |
| FR | 2085498 A1 | 12/1971 |

(Continued)

Primary Examiner — Bradley T King
Assistant Examiner — James K Hsiao
(74) Attorney, Agent, or Firm — Leydig, Voit & Mayer, Ltd.

(57) ABSTRACT

An energy absorption device includes a support, a dissipating element mounted around the support and being operable to deform plastically under the effect of a shock, and balls mounted with a given pressure against the dissipating element and intended to deform the dissipating element. The support is provided with grooves, and the balls are mounted opposite the grooves of the support and are operable to deform the dissipating element along the length of the grooves.

21 Claims, 5 Drawing Sheets

(56) References Cited

U.S. PATENT DOCUMENTS

| | | | | |
|---|---|---|---|---|
| 3,718,326 | A * | 2/1973 | Ristau | F16F 7/126 114/219 |
| 3,788,148 | A * | 1/1974 | Connell | B62D 1/192 188/371 |
| 4,006,647 | A * | 2/1977 | Oonuma | B62D 1/192 188/371 |
| 4,509,621 | A | 4/1985 | Desjardins et al. | |
| 5,871,235 | A * | 2/1999 | Wier | B60R 22/4633 188/67 |
| 5,911,438 | A * | 6/1999 | Anspaugh | B62D 1/192 280/775 |
| 5,984,354 | A * | 11/1999 | Kim | F16F 7/126 188/371 |
| 6,186,487 | B1 * | 2/2001 | Kesinger | F16F 7/126 267/216 |
| 6,293,872 | B1 * | 9/2001 | Ganser | B62D 1/192 29/517 |
| 6,957,727 | B2 * | 10/2005 | Leung | B60R 19/26 188/129 |
| 7,416,216 | B2 * | 8/2008 | Shoda | B62D 1/185 280/775 |
| 7,429,060 | B2 * | 9/2008 | Yamada | B62D 1/16 280/755 |
| 7,481,130 | B2 * | 1/2009 | Yamada | B62D 1/185 280/775 |
| 7,559,267 | B2 * | 7/2009 | Yamada | B62D 1/185 280/775 |
| 2003/0227162 | A1 * | 12/2003 | Ulintz | F16F 7/126 280/777 |

FOREIGN PATENT DOCUMENTS

| | | |
|---|---|---|
| GB | 1300665 A | 12/1972 |
| GB | 2452589 A | 3/2009 |
| SU | 431066 A1 | 6/1974 |
| WO | WO 2010/105055 A2 | 9/2010 |

* cited by examiner

IMPACT ATTENUATION DEVICE

CROSS REFERENCE TO RELATED APPLICATIONS

This application is a U.S. National Stage Application under 35 U.S.C. § 371 of International Application No. PCT/EP2015/051008 filed on Jan. 20, 2015, and claims benefit to Belgian Patent Application No. BE 2014/0046 filed on Jan. 29, 2014. The International Application was published in French on Aug. 6, 2015 as WO 2015/113867 A1 under PCT Article 21(2).

FIELD

The present invention relates to a mechanical shock absorber intended to be installed between an impact area and an entity to be protected. More specifically, it relates to a shock absorber using energy dissipation through plastic deformation, the absorption capacities of which can be adjusted manually or automatically on the site where it is used or when manufacturing it.

BACKGROUND

For several decades, the issue of protecting the occupants of a military or civilian vehicle subjected to an explosive detonation has become a major concern for decision-makers, both during peacekeeping operations and armed conflicts. Several technical solutions have been considered, and some have been implemented. These solutions are essentially based on energy dissipation through material deformation.

For example, document GB 2,452,589 A describes such an energy absorption device that is intended to protect occupants from the effects of an excessive G-force. The device comprises a mitigating strip positioned between a chassis of the vehicle and a structure attached to the occupant's seat. During an explosion, the mitigating strip is bent and pulled between rollers that are secured to the structure of the occupant's seat, which makes it possible to absorb part of the energy.

A shock absorption device provided with a platform supporting a load to be protected from a shock is known from document U.S. Pat. No. 3,446,469. The platform is mounted on a scissor mechanism with compressible units positioned below the platform and intended to deform in case of shock.

Documents SU 431,066, EP 1,155,940, U.S. Pat. No. 3,696,891, U.S. Pat. No. 4,509,621 and FR 2,085,498 teach energy absorption devices comprising a dissipating element deformed using balls.

In general, the mechanisms proposed in the prior art are designed to dissipate a maximum amount of energy over a given travel, but sized so that the response of the shock absorber is optimized for a given configuration of the threat, i.e., characteristics of the explosion (explosive charge, distance between the explosive and the vehicle, etc.) assumed beforehand.

Furthermore, the proposed mechanisms generally do not make it possible to control the plastic deformations involved. As a result, the acceleration experienced by the occupant during the shock varies over time with a peak at the beginning of travel followed by a decrease until all of the energy involved has been dissipated.

Moreover, proposed mine protection mechanisms are designed so as to offset the blast of an explosion occurring under a vehicle, i.e., to offset the initial shock experienced by the occupants when the vehicle is projected upward. In general, these mechanisms do not take into account the second shock, called the "drop-down", caused when the vehicle returns to the ground. Yet the acceleration experienced during the secondary shock, although having a lower amplitude than the primary shock, is nevertheless very significant and has the characteristic of being felt over a longer time interval than the first shock.

Document WO 2010/105055 provides part of the solution to the various problems described above. The energy dissipation device proposed in that document is mechanical or hydraulic and comprises means for adjusting the degree of absorption based on the weight of the occupant, for both the primary and secondary shocks. The system provides an adjustment that may be different for the primary shock and the secondary shock, and which can therefore be optimized to take into account the different characteristics of the two shocks in terms of acceleration. However, this device has the drawback that the system is repositioned in the rest position or, in other words, reset between the primary shock and the secondary shock. Taking the different characteristics of the two shocks into account will therefore require a real-time adjustment between the two shocks. In the field, it is unlikely that such a system will be operational, since the first shock causes considerable mechanical and electronic damage that will make the real-time adjustment before the second shock difficult, or even impossible.

SUMMARY

In an embodiment, the present invention provides an energy absorption device comprising a support, a dissipating element mounted around the support and being operable to deform plastically under the effect of a shock, and balls mounted with a predetermined pressure against the dissipating element and intended to deform the dissipating element. The support is provided with grooves, and the balls are mounted opposite the grooves and are operable to deform the dissipating element along a length of the grooves.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present invention in an embodiment provides shock absorbers that overcome certain drawbacks of the state of the art. The majority of the current devices are not adjustable based on the weight of the occupant, the configuration of the vehicle (mass, inertia, etc.) or the explosive charge. Yet the nature of modern conflicts and threats implies that operators in the field have to deal with completely different threats, the characteristics of which cannot be identified during the mission preparation phase, much less during the design of protective solutions.

In an embodiment, the present invention aims to produce a shock absorber, the characteristics of which can be adapted to the actual usage conditions so as to optimize protection. According to the embodiment of the invention, it is possible to adapt the characteristics of the shock absorber for all of the targeted fields of application, namely to protect the occupants of a vehicle subjected to a mine explosion or an improvised explosive device explosion, to protect people or objects in case of accidents during transport using rail, land, maritime or air means, or to protect objects or consumer goods during airdrop operations.

For mine and IED protection, an embodiments of the present invention also aims to produce a shock absorber equipped with an appropriate device to attenuate the secondary shock when the vehicle returns to the ground, taking its particular characteristics into account. The device according to the invention must therefore be sized to allow different energy absorption for the primary shock and the secondary shock.

An embodiment of the present invention also aims to produce a shock absorber making it possible to transmit a quasi-constant acceleration to the occupants throughout the event, and to limit the severity of the shock transmitted to the people or objects for which protection is sought to an acceptable level, in the various situations described above.

A shock absorber according to an embodiment of the invention is appropriate for any system where relative movements with low or high speeds are present. It can thus equip land, rail, air or maritime transport vehicles in order to protect equipment or occupants from mechanical shocks. It may also be incorporated into packaging systems for dropping airborne equipment. It can also be used to protect shock-sensitive static structures or equipment or parts of equipment where shocks may occur.

For particular applications where protection is required against mine explosions or improvised explosive devices (IED) under a vehicle, a shock absorber according to an embodiment of the invention may be sized to damp the shocks respectively experienced during the projection of the vehicle upward and during the return of the vehicle to the ground and must be adapted, within the limits of the sizing, to the level of the threat from which the occupants wish to be protected.

An embodiment of the invention provides an energy absorption device including:
- a support provided with grooves,
- a dissipating element mounted around said support and intended to deform plastically under the effect of a shock,
- balls mounted with a given pressure against the dissipating element and intended to deform the dissipating element, said balls being mounted opposite said grooves of the support and being intended to deform the dissipating element along the length of the grooves.

According to various embodiments of the invention, the energy absorption device includes at least one or a suitable combination of the following features:
- a hollow body in which the dissipating element and its support are intended to slide during the shock;
- balls mounted in a circular cage and bear in the longitudinal direction of the hollow body on an inner surface of said hollow body and in the transverse direction of the hollow body on the dissipating element;
- a lower surface that is conical or curved;
- means for adjusting the pressure with which the balls are pressed against the dissipating element;
- said adjustment means including a nut, the rotation of which during use causes a movement of the balls along the inner surface of the hollow body, which makes it possible to adjust the pressure with which the balls are pressed on the dissipating element;
- said adjustment means including a motor and a controller connected to one or more sensors;
- a support comprising a cylindrical part, the grooves being positioned on the outer surface of the cylindrical part and extending in the longitudinal direction of said cylindrical part;
- a dissipating element that forms an annular sleeve with a constant thickness along its longitudinal direction;
- a dissipating element that forms an annular sleeve with a variable thickness along its longitudinal direction;
- a dissipating element that includes two successive parts in its longitudinal direction, called the first part and the second part, having different geometric and/or physicochemical characteristics so as to respectively damp a first shock and a second shock;
- the second part having a different thickness and length than the first part;
- the second part being shorter and thicker than the first part;
- the thickness of the dissipating element increases relative to the movement direction of the dissipating element in case of shock;
- the first part and the second part of the dissipating element respectively have a constant thickness;
- the support is topped at one end with a plate provided with tongues resting on one end of the hollow body;
- the dissipating element is screwed on the support to make it easier to replace.

An embodiment of the present invention relates to a vehicle or a packaging system for airdropping materials, goods or people comprising an energy absorption device as described above. An embodiment of the present invention relates to an energy absorption method intended to protect a structure and/or an occupant during a shock, using the device as described above, the method comprising a step for relative movement of the dissipating element and its support with respect to the hollow body leading to a plastic deformation of the dissipating element by the balls, said balls being guided in the grooves.

According to various embodiments of the invention, an energy absorption method includes at least one or a suitable combination of the following features:
- a step for adjusting the pressure with which the balls are pressed on the dissipating element, the adjustment being done based on measurements from one or more sensors;
- a step for breaking the tongues of the plate preceding the relative movement between the dissipating element mounted on its support and the hollow body;
- balls that deform the dissipating element over the first part during the first shock and over the second part distinct from the first part during the second shock, the first shock occurring when a vehicle explodes on an explosive device and the second shock occurring when the vehicle falls back to the ground;
- a step for replacing the dissipating element before the shock.

A shock absorber according to an embodiment of the invention may equip a vehicle. The term "vehicle" must be understood broadly, i.e., it encompasses any means of transportation including elevators, cableways, etc. It may also be intended to protect military and civilian infrastructures from shocks. It may for example be applied to the nuclear industry. It may also be incorporated into packaging systems for airdropping loads (equipment with or without an occupant, consumer goods or other objects).

A shock absorber according to an embodiment of the invention can be placed between the structure undergoing the shock and the element to be protected from the shock. If a mine explodes under a vehicle, the absorber is placed between the occupant's seat and the interface component of the platform (vehicle, turret, or other crew cell) via which the shock is transmitted to the seat. For a crew cell installed in another system, which in turn is mounted on a vehicle (case of a turret), the absorber may also be mounted between the crew cell (turret basket or other) and the interface between that cell and the vehicle.

The shock absorber according to an embodiment of the invention is based on the principle of energy dissipation through plastic deformation. Balls are pressed with a more or less significant force against a dissipating element mounted on a support. During the shock, a relative movement between the balls and the dissipating element occurs, which makes it possible to dissipate the energy through deformation of the material making up the dissipating element.

According to an embodiment of the invention, the energy dissipation is adaptable and adjustable based on the risk level and factors influencing the transmissibility of the shock. The risk level may be adapted easily by adjusting the ball pressure, as explained later, or if necessary, by replacing the dissipating element with a specific model having the appropriate material characteristics and/or geometry. The material and its geometry may be selected from among the cases previously considered at any time before undertaking operations or after the first feared events. The dissipating element may further be sized to damp the primary shock and the secondary shock, respectively. It may thus have a variable thickness and/or be made from different materials.

The adjustment is done by modulating the pressure with which the balls are pressed against the deformable material. The balls are subjected to a pressure adjustable through a spacer or without a spacer and through a threaded element. That threaded element may in turn be adjusted manually or automatically. The adjustment takes account of all of the relevant factors on which the transmissibility of the shock from the support structure (vehicle) to the entity to be protected (occupant) depends and of specific application conditions. In the case of a mine explosion under a vehicle, the adjustment takes the following characteristics into account: (i) mass of the structure (vehicle and all of its on-board equipment) directly subjected to the blast of the explosion, (ii) mass of the entity to be protected (for example, the mass of the occupant), (iii) expected relative location (with respect to the vehicle) of the explosion under the vehicle, (iv) charge of the explosive (TNT equivalent), (v) distance of the explosive relative to the floor of the structure, (vi) severity of the shock caused when the vehicle returns to the ground.

For example, in the case of armored vehicles, it is required to provide protection against explosive charge levels (mines) classified in several categories (STANAG 4569): 6 kg, 8 kg or 10 kg TNT equivalent. In the field, the active element may be selected to adapt the absorber to the targeted mine category, and to a certain extent, to adapt the absorber to charge levels other than those considered to be "standard". The adjustment means will allow on-site adjustment of the pressure of the balls recommended for a given category if necessary. For example, if the active element is selected for the 6 kg TNT category, the adjustment makes it possible to cover charge levels close to the central value of the category, i.e., 6 kg+/−2 kg TNT (these values are provided for information only and are non-limiting).

As one non-limiting example, the shock absorber according to an embodiment of the invention is illustrated below for seat systems (seats) equipping vehicles such as tanks, tank turrets, police vehicles, peacekeeping force vehicles or civilian vehicles requiring mine protection.

Figure 1:
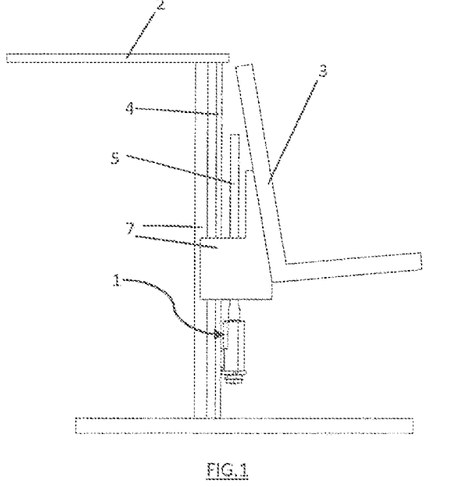
FIG. 1 illustrates a shock absorber according to an embodiment of the invention positioned inside the crew cell of a turret.

FIG. 1 shows the inside of the turret basket with the basket secured to the chassis of the vehicle by means of a mechanical link at the roof of the vehicle 2. In the illustrated example, the shock absorber 1 is mounted between the seat 3 and the column 4 and fastened at the latter.

Figures 2A, 2B:
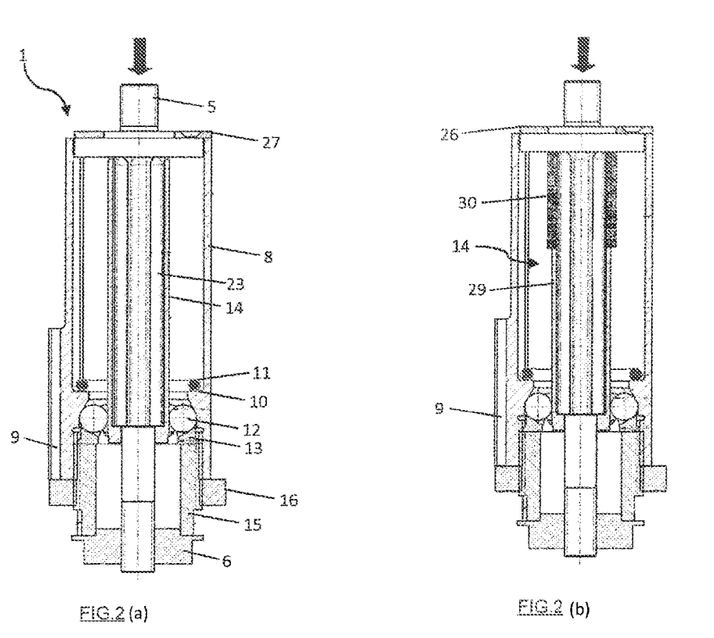
FIG. 2(a) is an axial cross-sectional view of a shock absorber according to an embodiment of the invention with a dissipating mechanism sized to dissipate the energy relative to the primary shock.
FIG. 2(b) is an axial cross-sectional view of a shock absorber according to an embodiment of the invention with a dissipating mechanism sized to dissipate the energy relative to the primary shock (blast) and to the secondary shock (drop-down), respectively.
Figure 3A:
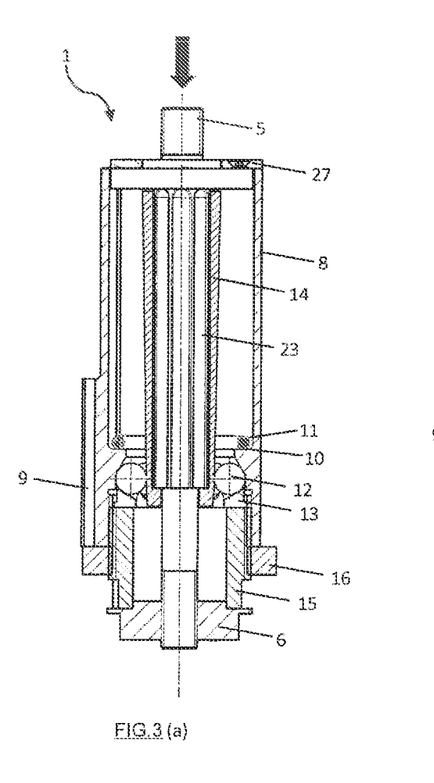
FIGS. 3(a) and 3(b) show an alternative of a shock absorber according to the embodiment of the invention depicted in FIG. 2 in which energy dissipator(s) is (are) frustoconical rather than cylindrical.
Figure 3B:
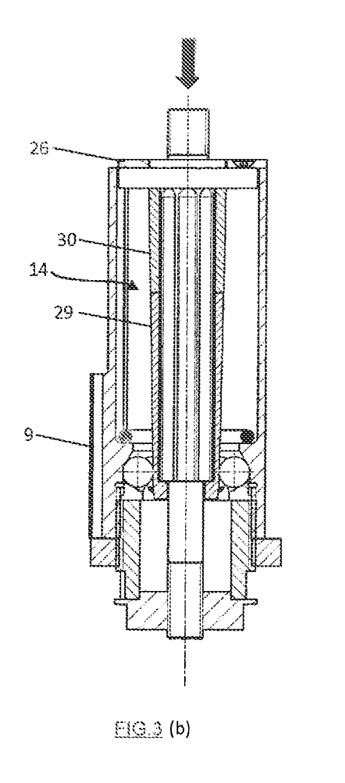

The shock absorber 1 according to an embodiment of the invention is shown in detail in FIGS. 2 and 3. According to an alternative shown in FIGS. 2(a) and 3(a), only one energy dissipating mechanism is provided for the primary shock. According to another alternative shown in FIGS. 2(b) and 3(b), a dissipating mechanism is provided for the primary shock and the secondary shock.

Irrespective of the alternative considered, the shock absorber 1 comprises two main parts that will move relative to one another during shock(s). A first part is secured to the platform of the vehicle and, more specifically, to the column 4 in the illustrated example, and a second part is secured to the entity to be protected, i.e., the seat 3 in the illustrated example. In the latter case, the connection between the seat 3 and the second part is provided by a rod 5 that is fastened to the seat 3 and to the lower base 6 of the second part (see FIGS. 1, 2 and 3). When a significant shock occurs, the second part and the seat 3 move relative to the first part, the linear movement of the seat 3 being provided by the guides 7.

Figure 4:
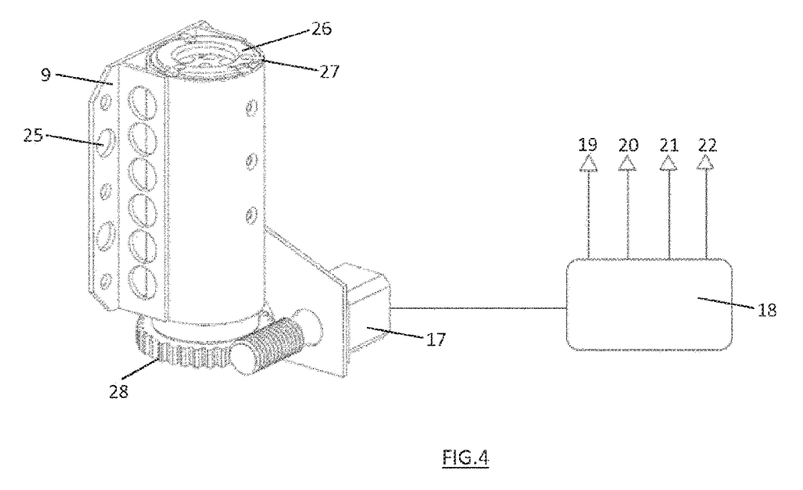
FIG. 4 is a three-dimensional view of a shock absorber according to an embodiment of the invention having adjustment means that are motorized and controlled by a controller connected to different sensors.

The first part comprises a body 8 fastened to the column 4 of the basket using the fastening structure 9 shown in FIG. 4 i.a. This body is hollow, the second part of the absorber being intended to slide within the hollow part during the shock. Balls 12 are mounted inside the hollow body 8 that are intended to deform the active component 14 of the second part during the shock. These balls 12 have a hardness higher than that of the active component 14, and are preferably metallic. They are arranged in a circular cage 13, of the ball bearing cage type. They are axially wedged at the rear of an abutment 10 provided inside the hollow body to limit the travel of the second part. The rear surface of the abutment 10 has a spherical or conical shape for reasons explained below. The balls are radially wedged on the active component 14 using adjustment means that comprise a threaded element, such as a nut 15. Rotating the nut 15 makes it possible to modulate the force applied on the ball cage 13, and thus the radial movement of the balls 12 owing to the particular shape of the rear surface of the abutment. Rotating the nut in the clockwise direction causes the balls to move toward the axis of the device and causes the balls to apply greater pressure on the energy dissipator. Conversely, rotating the adjusting nut in the counterclockwise direction causes a decrease in the pressure applied by the balls on the dissipator. Note that the adjustment is done such that the energy dissipation occurs over the entire length of the active element. The adjustment can be manual and, in that case, a locknut 16 is provided to secure the adjustment or automatic via a motor controlled remotely using a specific add-on device. In the example illustrated in FIG. 4, the motorized device (motor 17) is connected to a computer 18 that in turn is connected to one or more sensors. For example, the computer 18 may be connected to a sensor for detecting the weight of the occupant 19, speed 20, the position of the movable elements of the absorber 21, and the blast 22.

The second part of the absorber comprises a support 23 with a primarily cylindrical shape that is visible in FIGS. 2, 3, 6 and 7, i.a. The cylinder 23 serves as a support for the active element 14, also called the dissipating element, assuming the form of a sleeve. Preferably, the support 23 is provided with several grooves 24 (see FIG. 6). The grooves 24 extend axially over the height of the cylinder and serve as guide grooves for the balls 12 during sliding of the support 23. The grooves are distributed on the perimeter of the support so as to ensure the symmetry of the developed forces.

According to the alternative of FIGS. 2(*a*) and 3(*a*), the dissipating element 14 mounted on the support 23 is made from a single material (composite, metal or other) and is intended to dissipate the energy when the primary shock occurs. As illustrated in FIG. 2(*a*), it may have a constant thickness in that case forming a perfectly cylindrical part. It may also have a variable thickness, preferably with a wall thickness increasing in the movement direction of the support, as shown in FIG. 3(*a*). This is then referred to as a quasi-cylindrical or slightly frustoconical shape. This particular shape favors transmission of the acceleration in plateau form, i.e., transmission with a relatively constant acceleration level to the occupant outside the transitional phases for the start and end of travel of the support.

According to the other alternative of FIGS. 2(*b*) and 3(*b*), the dissipating element 14 is designed so as to be able to receive two distinct parts, numbered 29 and 30. The first part 29 is designed so as to dissipate the energy resulting directly from the blast of the explosion, the second part 30 being designed to dissipate the energy from the shock that results from the return to the ground of the vehicle. The two parts are sized to take into account the different loading of the two shocks. The sizing may be done using different materials, different thicknesses and/or different lengths for the two respective parts. For example, the thickness of the second part 30 may be greater than that of the first part and have a different length. In the example illustrated in FIGS. 2(*b*), 3(*b*), 7 and 8, the second part 30 is provided over approximately one third of the total dissipation travel. Each part can be cylindrical as in FIG. 2(*b*) or frustoconical as in FIG. 3(*b*). In the latter case, the outer surface of the second frustoconical part is in the continuation of the first frustoconical part.

Figure 5:
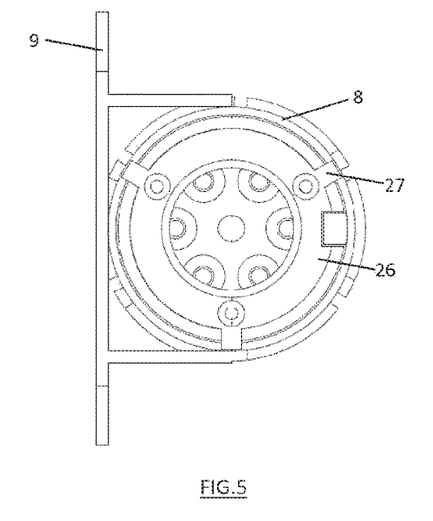
FIG. 5 is a top view of a shock absorber according to an embodiment of the invention.
Figure 6:
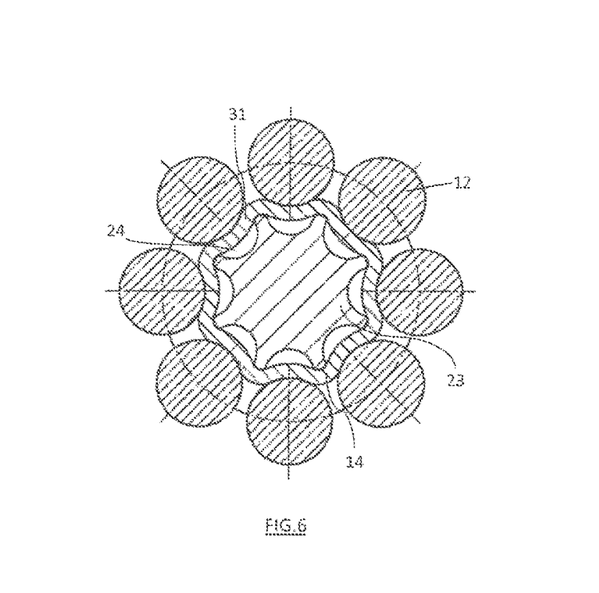
FIG. 6 is a simplified transverse cross-sectional view of part of a shock absorber according to an embodiment of the invention in which a dissipating element is mounted on its support, which comprises grooves, and in which a ball positioned opposite each groove deforms the dissipating element under the effect of the shock.
Figure 7:
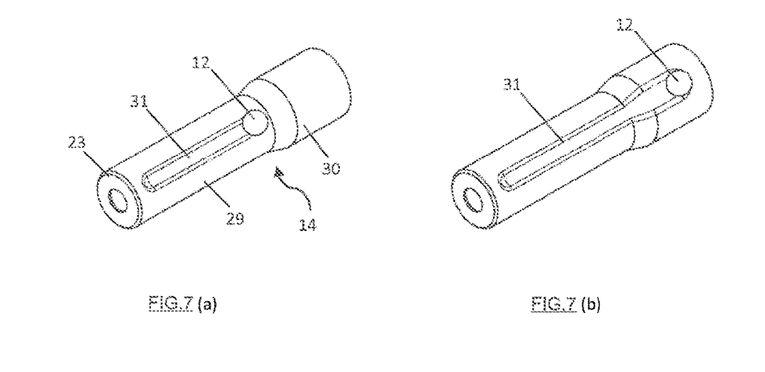
FIGS. 7(a) and 7(b) respectively show a furrow that forms in the dissipating element during the primary shock and during the primary and secondary shock for the shock absorber according to the alternative of FIG. 2(b)
Figures 8A, 8B:
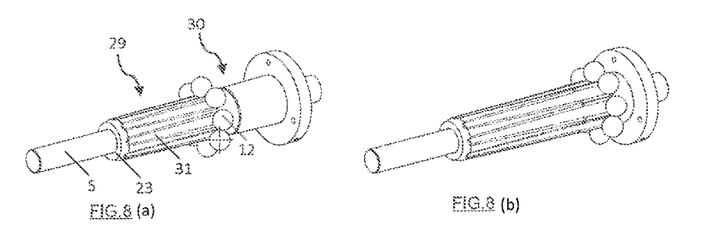
FIGS. 8(a) and 8(b) respectively show the furrows that form in the dissipating element during the primary shock and during the primary and secondary shocks for the shock absorber according to the alternative of FIG. 3(b).

Lastly, bears mentioning that the support 23 is topped, at its upper base, with a circular plate 26 with tongues 27 that cover the end of the body 8 of the absorber (see FIGS. 4 and 5). These tongues prevent any movement of the second part under the effect of simple vibrations or light shocks. They therefore serve as triggers and are sized to be sectioned only past a certain initially defined acceleration level. There may for example be three of them, and they may be uniformly distributed along the perimeter of the plate.

The operating principle of the device according to an embodiment of the invention is as follows. When an explosive charge is activated under the vehicle bearing the turret, the vehicle is projected upward with an impulse such that the vehicle is subjected to a strong overall acceleration. The inertia of the system consisting of the seat's occupant and the seat itself of the turret causes a relative movement of the occupant of the turret relative to the bottom of the basket. Indeed, the occupant and his seat tend to come closer to the bottom of the basket. During this "upward" movement from the bottom of the basket toward the seat, the rod 5 secured to the seat 3 forces the support 23 of the energy dissipator to deploy, i.e., to leave the main body 8 in the direction indicated by the arrow in FIGS. 2 and 3. The relative movement created between the active component 14 and the balls 12 makes it possible to dissipate the energy over the entire length of the active component, and thereby to reduce the acceleration transmitted to the occupant of the "blasted" vehicle. When the support comprises grooves, the balls plastically deform the dissipating element where the grooves are provided. The furrow-shaped deformation 31 (see FIGS. 7 and 8) occurs over the entire length of the active component 14 made up of one or two part(s) 29, 30 depending on whether the absorber is sized to take into account the primary shock or the primary shock and secondary shock, respectively.

The technical solution proposed by embodiments of the present invention can overcome to a certain extent the actual conditions. As long as the environmental conditions considered during the design incorporate the acceptable limits, operators can adjust the shock absorber manually or automatically on site so that the latter responds to the actual conditions. This is in particular applicable for mine protection and protection from Improvised Explosive Devices (IED), as well as for all types of situations where the feared shocks may occur accidentally. Likewise, the dissipating element can easily be changed in the field, as explained above, depending on the threat identified on the site of hostility or usage.

A shock absorber according to an embodiment of the invention makes it possible to protect the occupants by reducing the acceleration transmitted to them to acceptable levels. The acceleration transmitted to the occupants is practically constant, except during transitional phases at the beginning and end of travel, owing to the geometric and material characteristics of the energy dissipating element.

Furthermore, the grooves provided on the support of the dissipator allow guiding of the balls so as to ensure that their furrows on the support are completely linear. This linearity of the furrow avoids unwanted disruptions of the transmitted acceleration. This particular form of the support therefore makes it possible to guide the deformation of the dissipator so as to minimize any random behavior during the energy dissipation that may result in significant variations of the acceleration transmitted to the occupants. Likewise, in some cases, the slightly frustoconical shape of the dissipating element favors a plateau response of the acceleration experienced by the occupant.

Owing to the adjustment means, the pressure with which the balls are pressed on the dissipating element may be modulated so that the energy dissipation occurs over the entire length of the dissipating element. Dissipating the energy while the acceleration transmitted to the occupants remains practically constant and at the highest acceptable level throughout the entire dissipation travel guarantees the best compromise between operability in hostile terrain, which requires designing relatively low vehicles for visibility and stability reasons, and mine protection, which requires a significant standoff distance so as to undergo only a reduced fraction of the blast from the explosion.

A device according to an embodiment of the invention dissipates both the energy from the primary shock and the secondary shock and is sized to take into account the differences in acceleration experienced during those two shocks. The dissipating elements for the primary shock and the secondary shock, respectively, are arranged one after the other, which eliminates the need to reset the system between the two shocks.

A device according to an embodiment of the invention is provided with balls rolling on themselves, which prevents the device from being jammed in any case. It will always work, as long as the level of the shock is past the critical level defined beforehand. If the explosive charge is too great relative to that for which the device has been sized, the shock attenuation device will work by dissipating the theoretical maximum without any risk of being jammed, unlike a hydraulic dissipating device, for instance.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Shock absorber
2 Vehicle roof
3 Seat
4 Column
5 Rod
6 Lower base of the support
7 Guides for the linear movement of the seat
8 Body
9 Fastening structure
10 Abutment
11 End-of-travel damper
12 Ball
13 Ball cage
14 Dissipating element
15 Nut
16 Locknut
17 Motor
18 Controller
19 Weight sensor
20 Speed sensor
21 Position sensor
22 Blast sensor
23 Support
24 Groove or guide groove
25 Lightening opening
26 Plate
27 Tongue
28 Gear
29 First part of the dissipating element
30 Second part of the dissipating element
31 Furrow or impression

The invention claimed is:

1. An energy absorption device comprising:
a support;
a dissipating element mounted around the support and being operable to deform plastically under the effect of a shock from an undeformed state to a deformed state; and
balls mounted with a predetermined pressure against the dissipating element and radially outward of the support and the dissipating element;
wherein the support includes grooves, in the undeformed state of the dissipating element,
wherein the balls are mounted opposite the grooves and are operable to create furrowed deformations of the dissipating element along a length of the grooves.

2. The device according to claim 1, further comprising a hollow body, wherein the dissipating element and the support are configured to slide during the shock.

3. The device according to claim 2, wherein the balls are mounted in a circular cage and bear in a longitudinal direction of the hollow body on an inner surface of said hollow body and in a transverse direction of the hollow body on the dissipating element.

4. The device according to claim 2, wherein the support is topped at one end with a plate provided with tongues resting on one end of the hollow body.

5. The device according to claim 2, further comprising a pressure adjuster configured to adjust the pressure with which the balls are pressed against the dissipating element.

6. The device according to claim 5, wherein the pressure adjuster comprises a nut, wherein a rotation of the nut during use causes a movement of the balls along the inner surface of the hollow body which makes it possible to adjust the pressure with which the balls are pressed on the dissipating element.

7. The device according to claim 5, wherein the pressure adjuster comprises a motor and a controller connected to one or more sensors.

8. The device according to claim 1, wherein the support comprises a cylindrical part, wherein the grooves are positioned on the outer surface of the cylindrical part and extend in the longitudinal direction of the cylindrical part.

9. The device according to claim 1, wherein the dissipating element forms an annular sleeve with a variable thickness along its longitudinal direction.

10. The device according to claim 9, wherein the thickness of the dissipating element increases relative to the movement direction of the dissipating element in case of shock.

11. The device according to claim 1, wherein the dissipating element comprises, along its longitudinal direction, a first part and a second part, the first part and the second part having different geometric and/or physicochemical characteristics so as to respectively damp a first shock and a second shock.

12. The device according to claim 11, wherein the second part has a different thickness and/or length from the first part.

13. The device according to claim 11, wherein the second part is shorter and thicker than the first part.

14. The device according to claim 1, wherein the dissipating element is screwed on the support to facilitate replacement.

15. A vehicle comprising the energy absorption device of claim 1.

16. A packaging system for airdropping materials, goods or people comprising an energy absorption device according to claim 1.

17. An energy absorption method for protecting a structure and/or an occupant during the shock, using the energy absorption device of claim 1, the method comprising:
the energy absorption device being configured to allow, in response to the shock, relative movement of the dissipating element and the support with respect to a hollow body leading to a plastic deformation of the dissipating element by the balls,
wherein the balls are guided in the grooves.

18. The method according to claim 17, further comprising adjusting the pressure with which the balls are pressed on the dissipating element, the adjustment being done based on measurements from one or more sensors.

19. The method according to claim 17, further comprising breaking tongues of a plate preceding the relative movement between the dissipating element mounted on the support and the hollow body.

20. An energy absorption device comprising:
a support;
a dissipating element mounted around the support and being operable to deform plastically under the effect of a shock from an undeformed state to a deformed state;
balls mounted with a predetermined pressure against the dissipating element and intended to deform the dissipating element;
a hollow body; and
a pressure adjuster configured to adjust the pressure with which the balls are pressed against the dissipating element,
wherein the support includes grooves, in the undeformed state of the dissipating element,
wherein the balls are mounted opposite the grooves and are operable to deform the dissipating element along a length of the grooves,
wherein the dissipating element and the support are configured to slide during the shock,
wherein the pressure adjuster comprises a nut, and
wherein a rotation of the nut during use causes a movement of the balls along the inner surface of the hollow body which makes it possible to adjust the pressure with which the balls are pressed on the dissipating element.

21. An energy absorption device comprising:
a support;
a dissipating element mounted around the support and being operable to deform plastically under the effect of a shock from an undeformed state to a deformed state;
balls mounted with a predetermined pressure against the dissipating element and intended to deform the dissipating element;
a hollow body; and
a pressure adjuster configured to adjust the pressure with which the balls are pressed against the dissipating element,
wherein the support includes grooves, in the undeformed state of the dissipating element,
wherein the balls are mounted opposite the grooves and are operable to deform the dissipating element along a length of the grooves,
wherein the dissipating element and the support are configured to slide during the shock, and
wherein the pressure adjuster comprises a motor and a controller connected to one or more sensors.

* * * * *